(12) United States Patent
Sanders et al.

(10) Patent No.: US 7,954,699 B1
(45) Date of Patent: Jun. 7, 2011

(54) FACILITATING MULTI-TRANSACTION CURRENCY HANDLING PROCESSES

(75) Inventors: William Thomas Sanders, Denver, NC (US); Daniel Christopher Bohen, Charlotte, NC (US); Amy Baker Folk, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 209 days.

(21) Appl. No.: 12/183,727

(22) Filed: Jul. 31, 2008

(51) Int. Cl.
*G06Q 40/00* (2006.01)
*G07D 11/00* (2006.01)
*G07K 19/00* (2006.01)

(52) U.S. Cl. ........ 235/379; 235/375; 235/380; 235/383; 705/1.1; 705/39; 705/43

(58) Field of Classification Search ................. 235/375, 235/379, 380, 383; 705/1.1, 39, 43; 41/375, 41/379, 380, 383
See application file for complete search history.

(56) References Cited

U.S. PATENT DOCUMENTS

| | | | | |
|---|---|---|---|---|
| 1,492,769 A | * | 5/1924 | Weber | 221/5 |
| 3,858,791 A | * | 1/1975 | Gendron | 229/72 |
| 3,900,160 A | * | 8/1975 | Goto et al. | 229/71 |
| 3,926,365 A | * | 12/1975 | Sandstrom | 229/72 |
| 3,973,237 A | * | 8/1976 | Sawaguchi et al. | 235/379 |
| 4,190,066 A | * | 2/1980 | Burnside | 221/129 |
| 4,664,417 A | * | 5/1987 | Rosenstrach et al. | 283/116 |
| 6,402,025 B1 | * | 6/2002 | Shepherd et al. | 235/379 |
| 6,626,357 B1 | * | 9/2003 | Ross | 235/379 |
| 2003/0046232 A1 | * | 3/2003 | Peters et al. | 705/43 |
| 2004/0016034 A1 | * | 1/2004 | Calder et al. | 902/13 |
| 2004/0016796 A1 | * | 1/2004 | Hanna et al. | 235/375 |
| 2005/0023340 A1 | * | 2/2005 | Ryan et al. | 235/379 |
| 2008/0029583 A1 | * | 2/2008 | Kojiro | 229/70 |
| 2009/0101723 A1 | * | 4/2009 | Uehara et al. | 235/7 A |

* cited by examiner

*Primary Examiner* — Daniel A Hess
*Assistant Examiner* — Ali Sharifzada
(74) *Attorney, Agent, or Firm* — Banner & Witcoff, Ltd.; Michael Springs (57) ABSTRACT

A transaction such as a withdrawal or deposit may be divided into multiple smaller transactions based on an amount of currency associated with the transaction. For example, in a withdrawal, a container in which withdrawn funds are to be placed may be of limited size. Thus, multiple containers may be needed to withdraw the requested funds. Accordingly, each container may be assigned or associated with a different transaction. Each transaction may be created automatically, for example, upon completion of a previous transaction. Additionally, a number of transactions needed may be determined automatically. Thus, a user might only need to initiate the overall transaction process. Initiation may be based on manual input or triggered using an identification device such as an RFID tag, iris scan, card swipe and the like.

20 Claims, 11 Drawing Sheets

FACILITATING MULTI-TRANSACTION CURRENCY HANDLING PROCESSES

BACKGROUND

Businesses and other organizations often require a supply of cash to fund transactions such as providing change for customer purchases. In some instances, such businesses and organizations use a cash handling device to provide an accessible cash supply. Occasionally, the supply of cash must be reduced to manageable levels so that a cash handling device does not overflow. Typically, a transport carrier will service the cash handling device and withdraw excess funds into one or more containers, each container being identified as a different transaction. Additionally, a transport carrier (or other user) must manually create each transaction that is needed for each of the multiple containers.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to some aspects, a withdrawal process may be divided into multiple transactions, each with a different transaction identifier. A cash handling device or other device may initially receive a withdrawal request. The cash handling device may then determine the size of a destination container, such as a bag, and determine a number of containers needed to store the requested funds. Each individual container may require a separate transaction and thus, a number of transactions may be created based on the number of containers required if the amount of requested funds exceeds the capacity of a single container. In one or more arrangements, each transaction in the withdrawal may be created automatically without manual intervention. Thus, according to some aspects, once a user initiates the overall withdrawal process, the subsequent transaction creation, currency dispensing and other functions may be automated and might not require manual intervention. Each transaction may further be initiated either automatically or manually. An identifier such as a radio frequency ID (RFID) tag may be created for each container and transaction.

According to another aspect, a container size may be automatically identified using pre-stored capacity information. For example, a container may have a container type identifier or code and thus may be used to identify a corresponding capacity.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
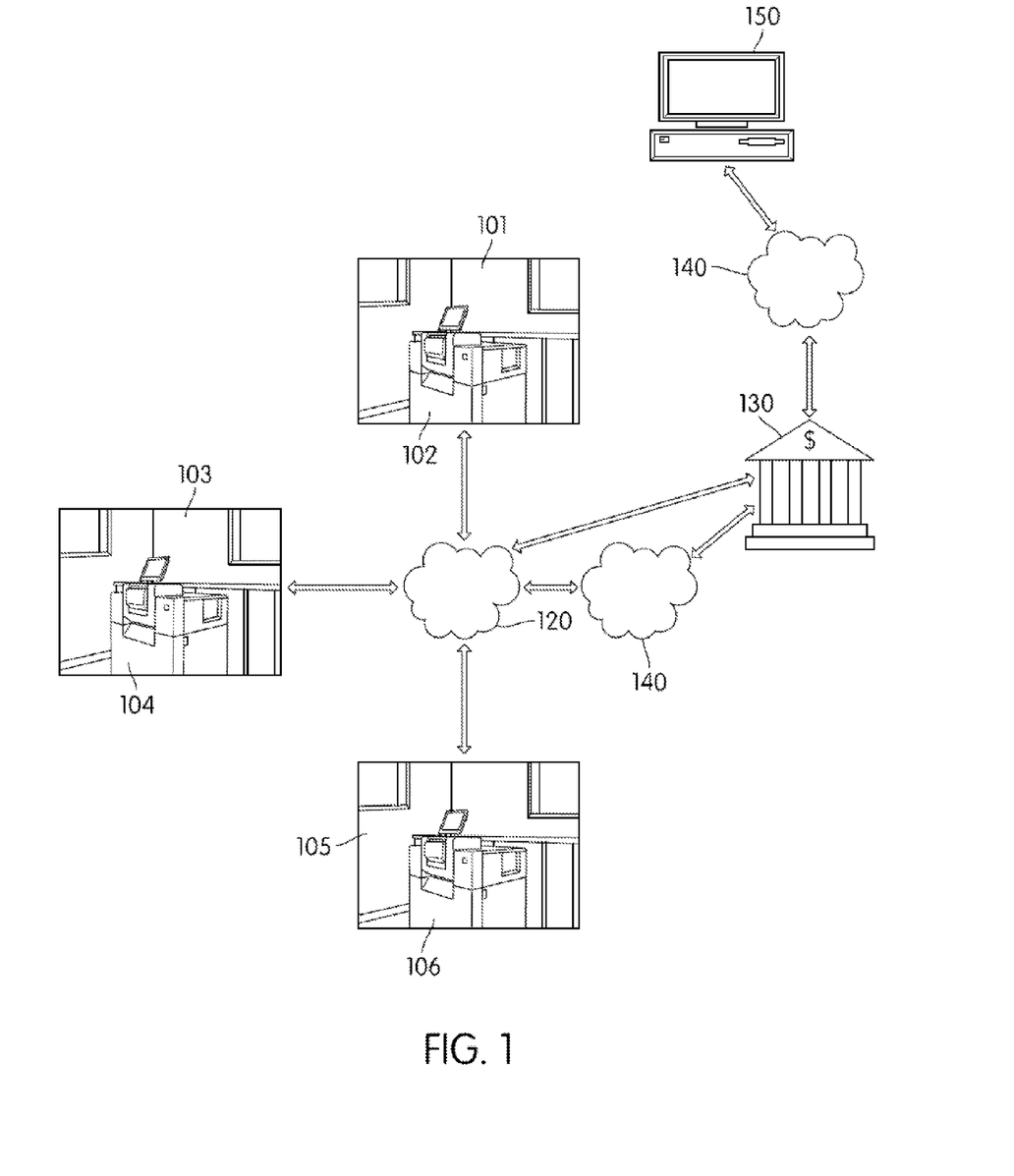
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
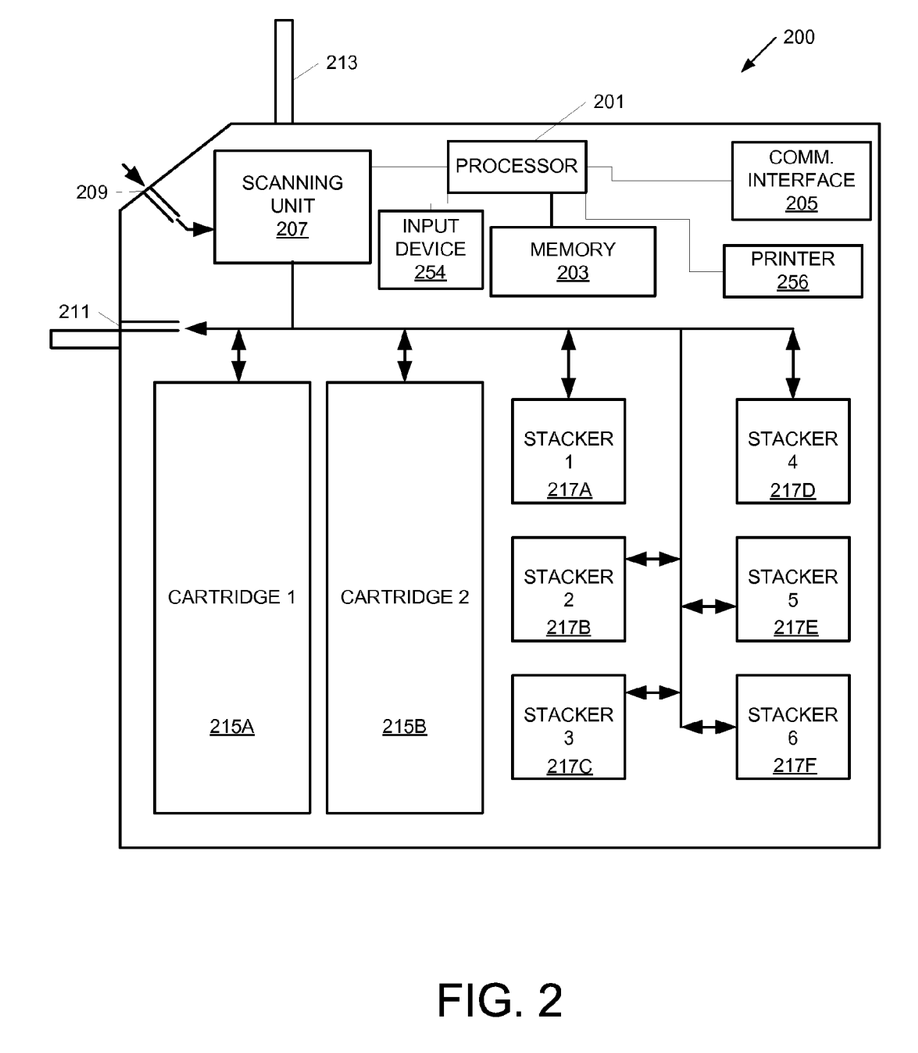
FIG. 2 illustrates a simplified diagram of a currency recycler in accordance with one or more aspects described herein.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and stackers 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
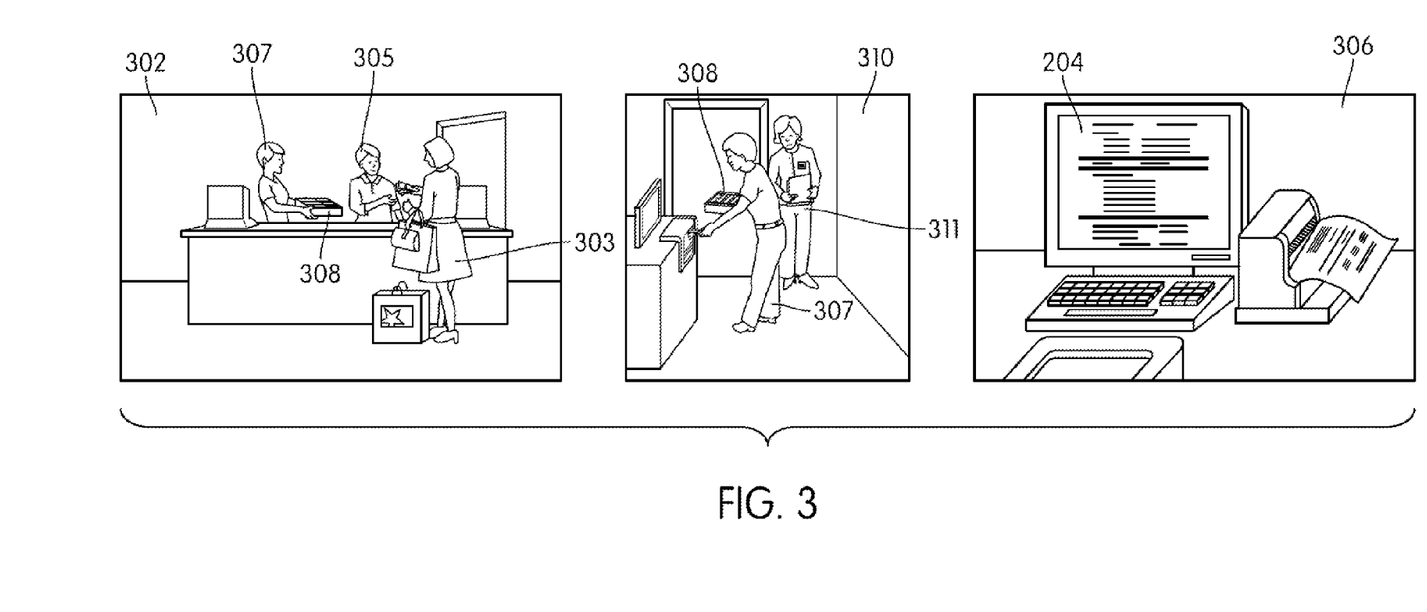
FIG. 3 illustrates various features of a currency recycler that may be used in accordance with one or more aspects described herein.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
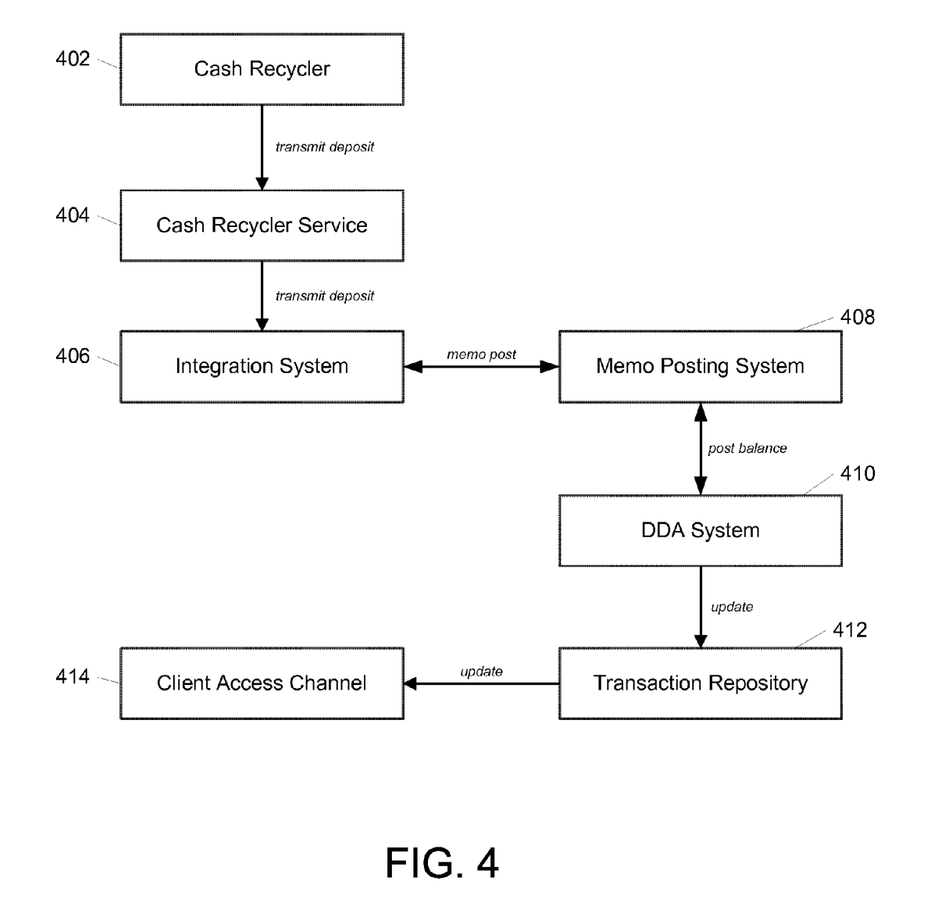
FIG. 4 illustrates additional features of a currency recycler used in one or more aspects described herein.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers many advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Use of cash handling devices such as a cash recycler requires the removal and replenishment of currency into the device on a periodic or aperiodic basis. For example, if a specific denomination is running low, that denomination might require replenishment by the financial institution. Alternatively, if there is too much of a denomination, removal might be needed. Typically, the financial institution or the business or other entity using the cash handling device will request a transport carrier to provide the additional funds or to remove funds, as the situation may require. Transport carriers will generally withdraw cash and place the cash into individual bags or containers. Each bag or container is subsequently labeled or otherwise identified by a container identification number, symbol, text or the like. The bag or container may be labeled or otherwise identified using a bar code tag, a radio frequency ID (RFID) tag, a printed label and the like.

Currently, to correctly identify each container (i.e., differentiating between bags and/or amounts included therein), transport carriers will typically begin new transactions for each bag withdrawal. Thus, once a bag is full, the transport carrier must subsequently create another withdrawal transaction to fill another bag and so on until all of the cash needing removal has been removed. Aspects described herein relate to a process whereby the transport carrier does not need to create each of the multiple transactions. Instead, the carrier might only need to initiate the overall withdrawal process (e.g., press of a single initiation button or swipe of an RFID device).

Figure 5:
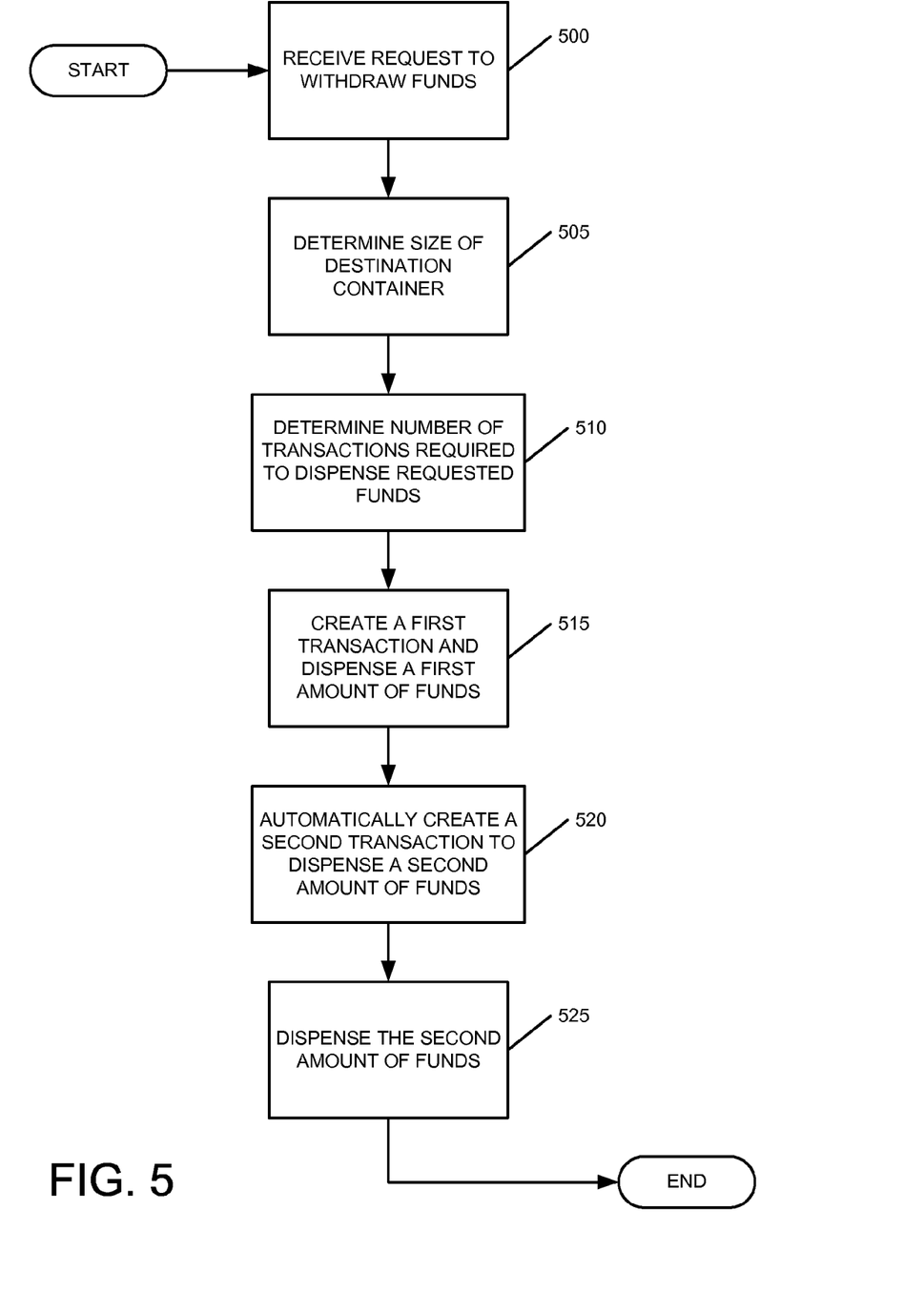
FIG. 5 is a flowchart illustrating an example method for creating multiple transactions for a withdrawal according to one or more aspects described herein.

FIG. 5 illustrates an example method for processing multiple withdrawal transactions for transport. The process may begin at step 500, where the cash handling device receives a request to withdraw funds. The request may be initiated in a variety of manner including manual input, scanning of an RFID device, iris scanning of the transport carrier and the like. The request may specify that the funds are being withdrawn for transport or some other transaction as well as an indication of an amount of withdrawal. In some arrangements, the amount of withdrawal may be specified by pre-defined levels of currency and/or types of denominations. For example, a user may request that an amount of funds be withdrawn such that the remaining amount of each denomination is at a predefined target level. In other arrangements, the user (e.g., the transport carrier) might not need to specify or know the withdrawal amount. In step 505, the cash handling device may determine a size of a destination container in which the withdrawn currency will be placed. The determination may be based on various information including user input, pre-stored container capacity information and the like.

Once the size of the destination container has been determined, the cash handling device may determine a number of transactions required in step 510. In one example, the cash handling device may create a transaction for each container that will be needed. Thus, the cash handling device may determine a number of bills that are being withdrawn to determine the number of containers and transactions required. In step 515, the cash handling device may begin the withdrawal process by creating a first transaction and dispensing an amount of funds. Creation of a transaction may include the generation of a transaction identifier, transmission of transaction data to a financial institution, reconciling balances and the like. The amount of funds dispensed may correspond to a capacity of the destination container. In one or more arrangements, the amount of funds dispensed into each container may be divided evenly (i.e., rather than maximizing the capacity of each container).

Upon completion of the first transaction, the cash handling device may automatically create a second transaction for dispensing another portion of the funds to be withdrawn into a second container in step 520. The automatic creation of the second transaction eliminates the need for a transport carrier or other user to manually create each individual transaction in order to dispense the entire amount of funds. The second amount of funds may subsequently be dispensed in step 525. Additional transactions may be created as needed. Additionally, upon creation, completion or during each of the transactions, the cash handling device may generate a transaction identifier such as a label, RFID tag or the like to identify the contents of a container and the associated transaction information. Upon completion of the withdrawal process, the cash handling device may store the transaction data and transmit the information to a financial institution. Data for each transaction may be linked or otherwise associated with one another to indicate that they are part of the same overall withdrawal transaction.

According to one or more aspects, while the creation of a new or subsequent transaction may be performed automatically, the dispensation of the funds for the created transaction may be manually initiated. This allows a user to control when the funds begin being dispensed so that the user may prepare a container or conduct any other preparations needed. Alternatively, the dispensation of the funds may begin automatically, e.g., upon detection of a container being put in place and ready to receive funds.

Figure 6A:
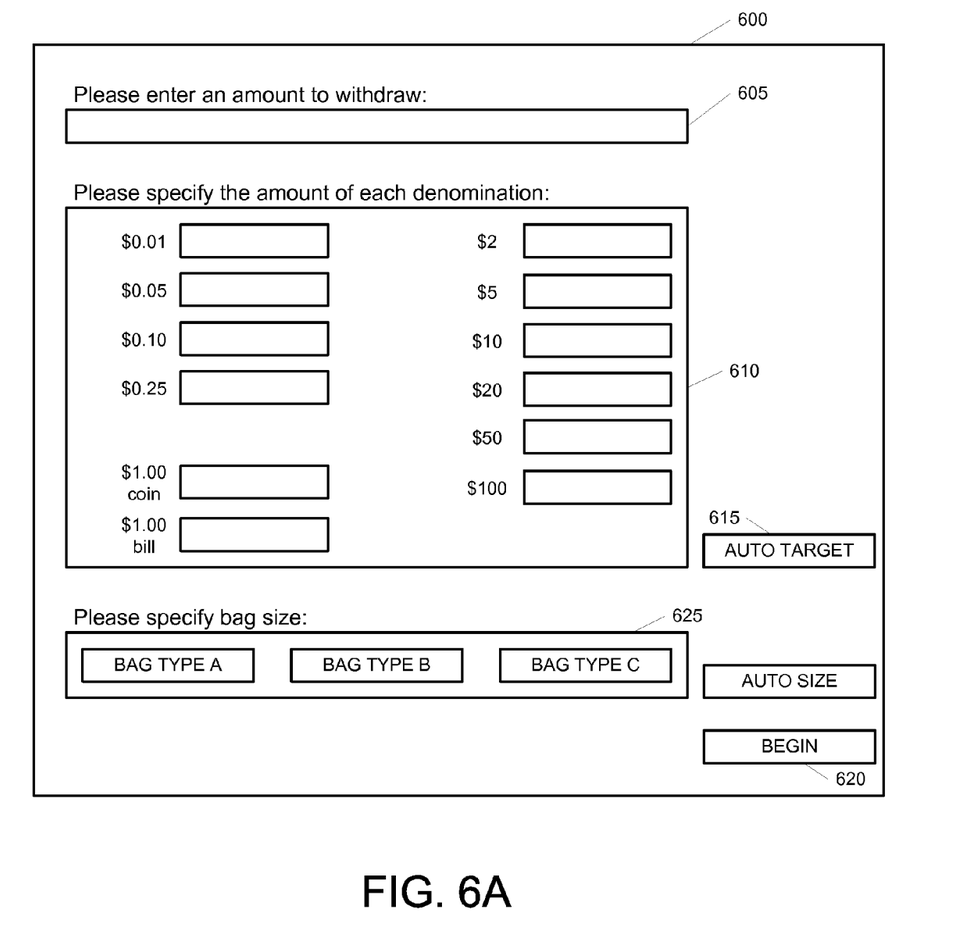
FIGS. 6A-6D illustrate example user interfaces for a withdrawal process according to one or more aspects described herein.

FIGS. 6A-6D illustrate user interfaces that may be displayed during the above described method of FIG. 5. FIG. 6A, for example, illustrates the initiation of a withdrawal. Interface 600 allows a user to enter an amount to withdraw in field 605 and to specify the amount of each denomination in fields 610. Additionally, interface 600 includes an option 615 to take the denominations down to a pre-defined target level. Thus, upon selection of option 615, fields 605 and 610 may be grayed out since the withdrawal amount has been specified based on the pre-defined target level(s). Using option 615, the user might not need to know the amount to be withdrawn. Begin option 620 may be included in interface 600, allowing a user to initiate the withdrawal process. Interface 600 may further include bag size specification options 625 that allow a user to select a bag or container size for the withdrawn funds. Alternatively, the container size may be automatically determined.

Figure 6B:
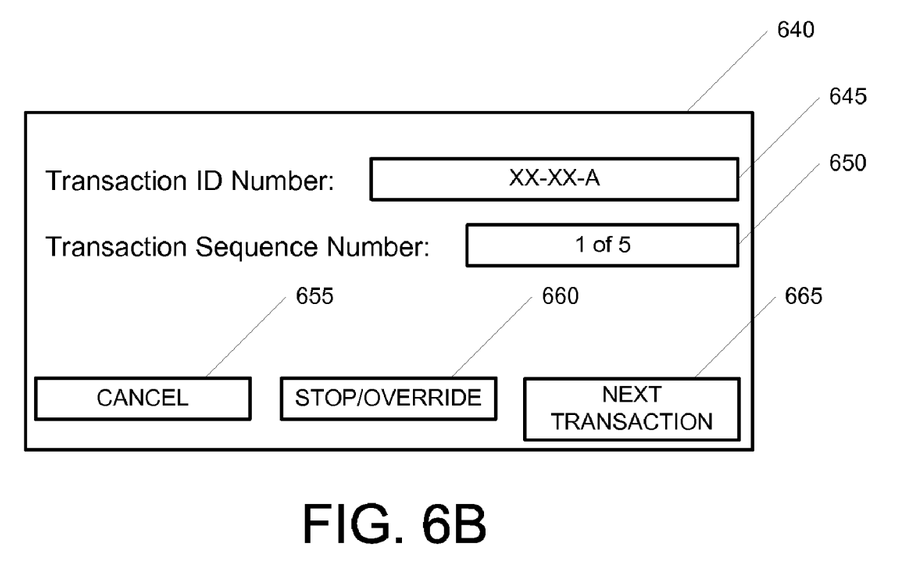

FIG. 6B illustrates an interface 640 that may be displayed after a first withdrawal transaction has been created. Interface 640 may include a transaction ID number 645, a transaction sequence number 650, a cancellation option 655, a manual stop or override option 660 and a next transaction option 665. Transaction sequence number 650 may be configured to show the position of the current transaction in the overall withdrawal process. For example, in interface 640, the transaction is the $1^{st}$ of 5 transactions in the overall withdrawal process. Cancellation option 655 may allow a user to cancel the withdrawal process while manual stop or override option 660 may allow a user to stop or end the current transaction (e.g., if the container becomes full). Next transaction option 665 allows a user to have the cash handling device create the next transaction and begin dispensing a second amount of funds.

Figure 6C:
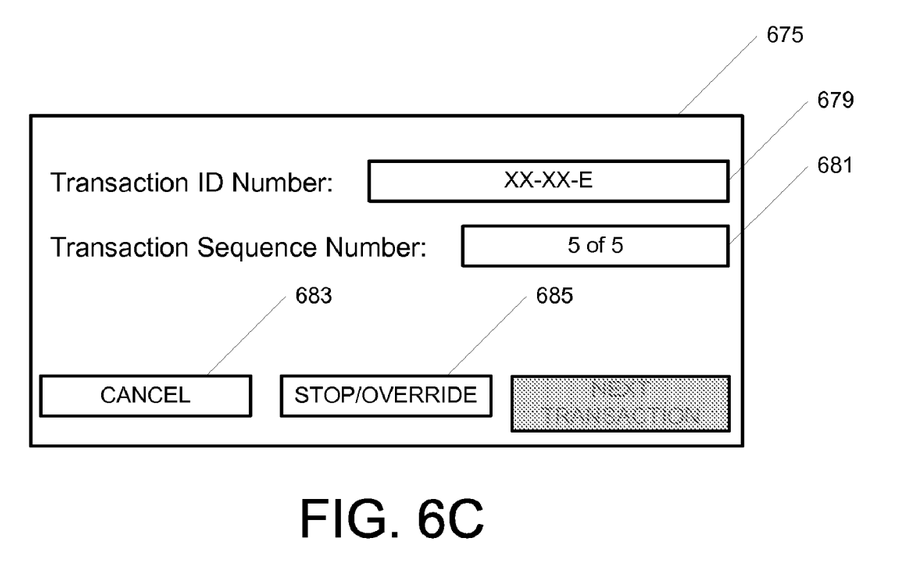

FIG. 6C illustrates an interface 675 in which a subsequent transaction is being processed and a second amount of funds is being dispensed. As with interface 640 (FIG. 6B), interface 675 may include a transaction ID 679, a transaction sequence number 681, cancellation option 683 and stop/override option 685. Since this subsequent transaction is the last transaction, a next transaction option (e.g., option 665 of FIG. 6B) might not be included or might not be active (i.e., not selectable).

Figure 6D:
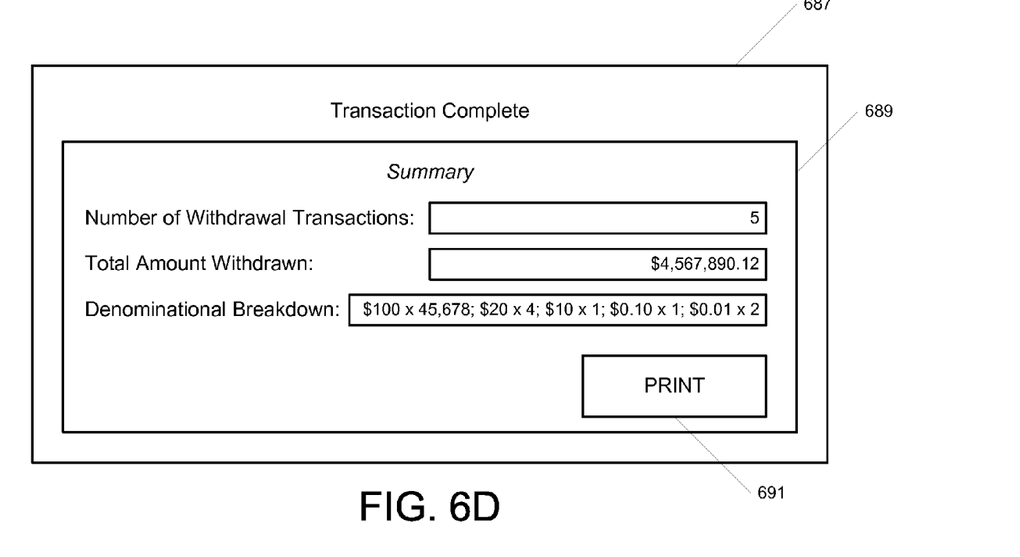

FIG. 6D illustrates a transaction completion interface 687 that includes a summary 689 of the overall withdrawal process including a number of withdrawal transactions, a total amount withdrawn, a denominational breakdown and a print option 691. Print option 691 may be used generate a receipt of the overall withdrawal transaction.

Figure 7:
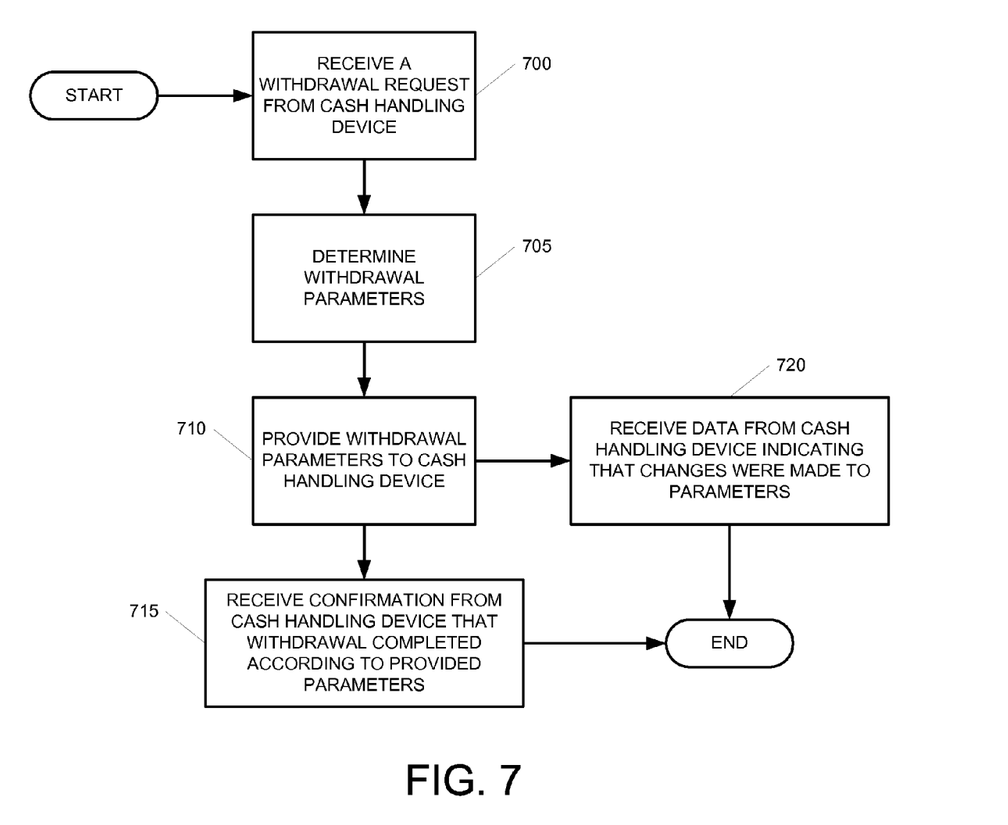
FIG. 7 is a flowchart illustrating an example method for processing a withdrawal request according to one or more aspects described herein.

In some arrangements, parameters of a withdrawal may be specified by a financial institution. FIG. 7 illustrates an example method whereby a financial institution receives a withdrawal request and instructs the cash handling device as to how many withdrawal transactions to create and use. In step 700, the financial institution (or a server thereof) may receive a withdrawal request from a cash handling device. The withdrawal request may include information such as a withdrawal amount, denominations requested, a bag or container identifier, container size information and the like. In step 705, the financial institution may determine withdrawal parameters including a number of transactions to create, a number of denominations to dispense for each transaction, a number of containers to use and the like. In one example, the financial institution may prefer to have multiple containers of smaller amounts and thus choose not to maximize the capacity of each container. In another example, the financial institution may wish to group funds by denomination or, alternatively, may wish to have containers of mixed denominations.

In step 710, the financial institution may provide the withdrawal parameters to the cash handling device. Upon completion of the withdrawal process, the financial institution may receive confirmation from the cash handling device that the withdrawal process was completed according to the specified parameters in step 715. Alternatively, the financial institution may receive data indicating that one or more changes were made to the withdrawal parameters in step 720. The data may include the parameters that were used instead. Parameters may be changed if a user manually overrides one or more specifications or if the parameters are not feasible. For example, if the financial institution specifies that the withdrawal is to be divided into 5 containers, but the cash handling device only has 3 containers, the parameters may be changed locally at the cash handling device such that the requested funds may be withdrawn in 3 containers or 3 transactions.

Figure 8:
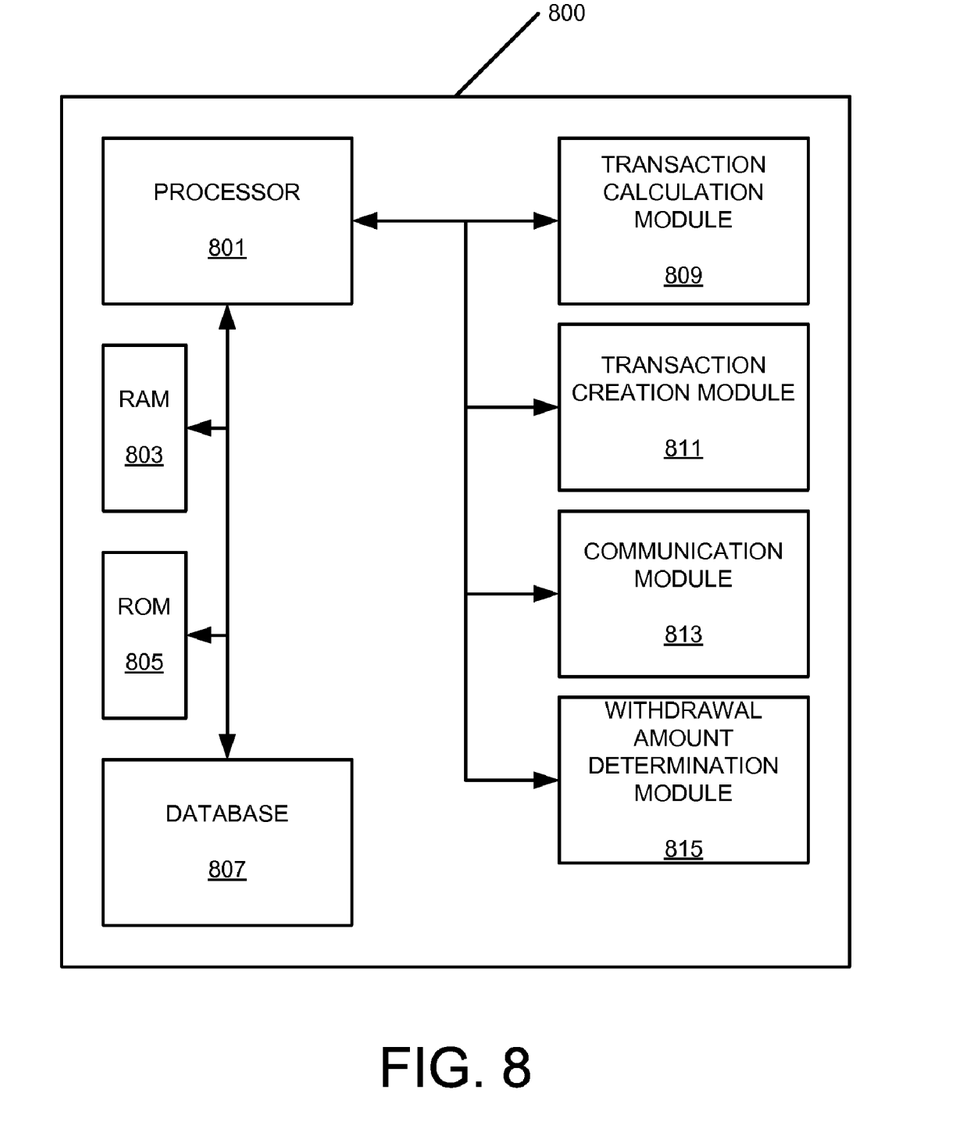
FIG. 8 illustrates an apparatus for processing multi-transaction withdrawals according to one or more aspects described herein.

FIG. 8 illustrates an apparatus having various modules for conducting a multi-transaction withdrawal. Apparatus 800 may include a processor 801, memory such as RAM 803, ROM 805 and database 807, a transaction calculation module 809, a transaction creation module 811, a communication module 813, a withdrawal amount determination module 815. Processor 801 may be configured to execute various instructions and perform calculations based on data received from modules 809, 811, 813 and 815. Transaction calculation module 809 may be configured to determine a size of a destination container and number of transactions to create for a withdrawal. Transaction creation module 811 may be configured to subsequently create each of the transactions based on the determined number of transactions. Additionally, withdrawal amount determination module 815 may be configured to determine an amount of funds that is to be withdrawn or dispensed. For example, withdrawal amount determination module 815 may calculate a number of bills for each denomination to withdraw if a user selects an option to bring each denomination down to a predefined target level. Communication module 813 may be configured to transmit and receive data from one or more other devices, including a financial institution server.

The aspects described herein may be used with other transactions that may require division of a single process into multiple transactions. For example, a deposit of funds from 5 different cashier registers might be automatically deposited under 5 different deposit transactions. The 5 deposit transactions may be automatically created based on a determination of a number of deposits to be made (e.g., detecting a number of registers inserted into a cash handling device).

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements of the other embodiments. It will also be appreciated and understood that modifications may be made without departing from the true spirit and scope of the present invention. The description is thus to be regarded as illustrative instead of restrictive on the present invention.

We claim:
1. A method comprising:
   receiving, by a cash handling device, a container type code; and
   determining a size of a currency receiving and storage container using the container type code;
   dispensing a first portion of funds to be withdrawn by the cash handling device as a first transaction into a currency receiving and storage container of the determined size;
   automatically generating, by the cash handling device, a first transaction identifier for the dispensed first portion of funds upon completion of the first transaction and assigning the first transaction identifier to the first transaction;

in response to completion of the first transaction, automatically creating, by the cash handling device, a second transaction different from the first transaction, the second transaction including dispensing a second portion of the funds to be withdrawn; and automatically generating, by the cash handling device, a second transaction identifier for the dispensed second portion of the funds upon completion of the second transaction and assigning the second transaction identifier to the second transaction.

2. The method of claim 1, wherein dispensing the first portion of funds to be withdrawn includes determining a size of the first portion based on a size of the currency receiving and storage container.

3. The method of claim 1, wherein automatically generating the first transaction identifier further includes automatically generating, by the cash handling device, an identifier tag storing the first transaction identifier and a container identifier of the currency receiving and storage container receiving the dispensed first portion of funds.

4. The method of claim 1, further comprising determining a number of transactions to automatically create for the funds to be withdrawn based on the determined size of the currency receiving and storage container.

5. The method of claim 1, further comprising:
electronically linking, by the cash handling device, the first transaction with the second transaction; and
transmitting the first and second transaction identifiers to a financial institution to which the dispensed first and second portions of the funds to be withdrawn are to be delivered.

6. The method of claim 1, wherein the first portion of the funds to be withdrawn is dispensed in response to a command to reduce a currency level to a predefined target level, wherein the predefined target level is greater than 0.

7. A method comprising:
receiving a request to dispense funds from a cash handling device;
determining, by the cash handling device, a number of transactions needed to dispense the funds and an amount of funds to dispense in a first transaction based on a size of a currency storage container into which the funds are to be dispensed;
automatically creating, by the cash handling device, the first transaction corresponding to dispensing a first portion of the funds from the cash handling device, wherein the first portion includes the determined amount of funds to dispense in the first transaction;
conducting the first transaction; and
automatically creating, by the cash handling device, upon completion of the first transaction, a second transaction corresponding to dispensing a second portion of the funds, different from the first portion, from the cash handling device, wherein the first transaction is assigned a first transaction identifier and the second transaction is assigned a second transaction identifier.

8. The method of claim 7, wherein the cash handling device includes a currency recycler.

9. The method of claim 7, further including transmitting the first and second transaction identifiers to a financial institution to which the dispensed first and second portions of the funds are to be delivered.

10. The method of claim 7, wherein conducting the first transaction includes dispensing the first portion of the funds from the cash handling device into the currency storage container.

11. The method of claim 7, further comprising receiving user input corresponding to a command to initiate the first transaction, wherein the first transaction is conducted in response to the command.

12. The method of claim 7, further comprising generating the first transaction identifier corresponding to the first transaction and the second transaction identifier corresponding to the second transaction.

13. An apparatus comprising:
a processor; and
memory storing computer readable instructions that, when executed, cause the processor to:
receive a request to dispense funds from the apparatus;
determine a number of transactions needed to dispense the funds and an amount of funds to dispense in a first transaction based on a size of a currency storage container into which the funds are to be dispensed;
automatically create the first transaction corresponding to dispensing a first portion of the funds from the apparatus, wherein the first portion includes the determined amount of funds to dispense in the first transaction;
conduct the first transaction; and
automatically create, upon completion of the first transaction, a second transaction corresponding to dispensing a second portion of the funds, different from the first portion, from the apparatus, wherein the first transaction is assigned a first transaction identifier and the second transaction is assigned a second transaction identifier.

14. The apparatus of claim 13, wherein the apparatus includes a currency recycler.

15. The apparatus of claim 13, further comprising computer readable instructions that, when executed, cause the processor to transmit the first and second transaction identifiers to a financial institution to which the dispensed first and second portions of the funds are to be delivered.

16. The apparatus of claim 13, wherein conducting the first transaction includes dispensing the first portion of the funds from the cash handling device into the currency storage container.

17. The apparatus of claim 13, further comprising computer readable instructions that, when executed, cause the processor to receive user input corresponding to a command to initiate the first transaction, wherein the first transaction is conducted in response to the command.

18. The apparatus of claim 13, further comprising computer readable instructions that, when executed, cause the processor to generate the first transaction identifier corresponding to the first transaction and the second transaction identifier corresponding to the second transaction.

19. The apparatus of claim 13, wherein the request to dispense funds includes a request to lower an amount of currency to a predefined level, wherein the predefined target level is greater than 0.

20. One or more non-transitory computer readable media storing computer readable instructions that, when executed, cause an apparatus to:
receive a request to dispense funds from the apparatus;
determine a number of transactions needed to dispense the funds and an amount of funds to dispense in a first transaction based on a size of a currency storage container into which the funds are to be dispensed;

automatically create the first transaction corresponding to dispensing a first portion of the funds from the apparatus, wherein the first portion includes the determined amount of funds to dispense in the first transaction;
conduct the first transaction; and
automatically create, upon completion of the first transaction, a second transaction corresponding to dispensing a second portion of the funds, different from the first portion, from the apparatus, wherein the first transaction is assigned a first transaction identifier and the second transaction is assigned a second transaction identifier.

\* \* \* \* \*